(12) United States Patent
Itou

(10) Patent No.: US 7,445,158 B2
(45) Date of Patent: Nov. 4, 2008

(54) ELECTRONIC APPARATUS

(75) Inventor: Goro Itou, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 94 days.

(21) Appl. No.: 11/066,504

(22) Filed: Feb. 24, 2005

(65) Prior Publication Data

US 2005/0189425 A1 Sep. 1, 2005

(30) Foreign Application Priority Data

Feb. 27, 2004 (JP) ............................ P2004-054940

(51) Int. Cl.
*G06K 19/06* (2006.01)
(52) U.S. Cl. ...................... 235/492; 235/487
(58) Field of Classification Search ................ 235/492, 235/487; 343/718; 455/90.3
See application file for complete search history.

(56) References Cited

U.S. PATENT DOCUMENTS 6,244,894 B1 * 6/2001 Miyashita .................... 439/500
6,271,793 B1 * 8/2001 Brady et al. ........... 343/700 MS

FOREIGN PATENT DOCUMENTS

JP 2001-223631 8/2001
KR 1020040013934 2/2004

* cited by examiner

*Primary Examiner*—Lisa M Caputo
(74) *Attorney, Agent, or Firm*—Hogan & Hartson LLP

(57) ABSTRACT

An antenna and a first connection terminal are disposed at a battery containing portion of a portable telephone. A noncontact IC chip and a second connection terminal are disposed at a battery lid. When the battery lid is removed from the battery containing portion, the noncontact IC chip and the first connection terminal are brought into a noncontact state and so the third party cannot use the noncontact IC chip.

7 Claims, 3 Drawing Sheets

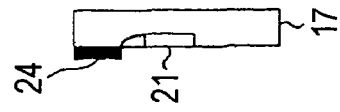
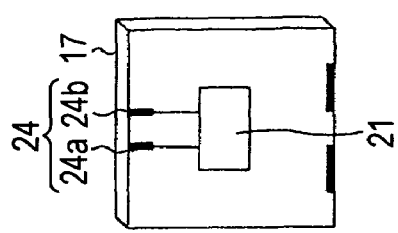 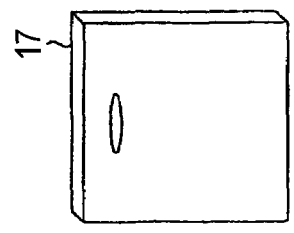
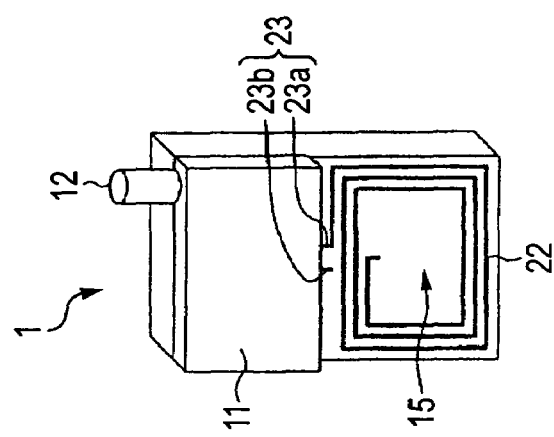
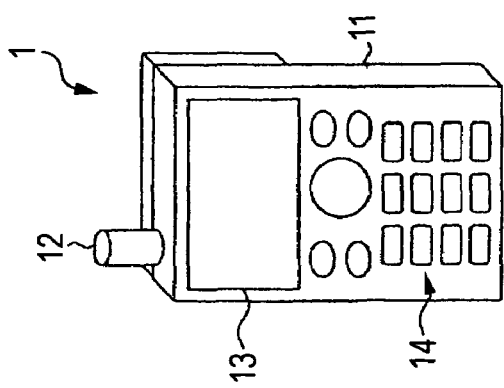

ELECTRONIC APPARATUS

BACKGROUND OF THE INVENTION

1. Field of the Invention

The present invention relates to an electronic apparatus which mounts a removable noncontact IC card.

2. Description of the Related Art

An IC card having an IC chip including a memory is small-sized, excellent in portability and storage capacity and is widely applied to various electronic apparatus such as a cellular phone and other portable electronic devices.

Particularly, a noncontact IC card which does not have a battery and includes an antenna for receiving a radio wave from an external apparatus for electromagnetic induction is a convenient type of a contact type IC card. The noncontact IC card is tried to be widely utilized in electronic money, a commuter pass or the like.

In recent years, the noncontact IC card has been variously tried to be applied to a portable electronic apparatus such as a portable telephone.

For example, JP-A-2001-223631 discloses a portable telephone including a noncontact IC card and a communicating means for transmitting and receiving information between the IC card and an external information apparatus.

The portable telephone receives a radio wave generated from an extreme apparatus referred to as an IC reader/writer and supplies electricity generated at an antenna in the IC card by means of electromagnetic induction to an IC chip. When the IC chip is supplied with power, the IC chip reads data stored in the IC chip per se and transmits the data to the IC reader/writer via the antenna. Thus, the IC card can wirelessly perform data communication with the IC reader/writer in noncontact.

JP-A-2001-223631 is referred to as a related art.

In the case that the IC card disclosed in JP-A-2001-223631 is applied to a portable telephone, it is general to integrate both of the IC chip and the antenna for the IC chip at inside of a case of the portable telephone. However, it is difficult to arrange the large antenna for the IC chip at a portion of the portable telephone containing various electronic circuits complicatedly and tightly with a limited space, and it influences the assembly of electronic circuits inherent to the portable telephone.

Further, when a user removes the IC card from the portable telephone in order to rewrite data or the like, the user may drop or lose the IC card. In the case, there is a crisis that a malicious third party who picks up the IC card closes the IC card to the reader/writer so that personal information stored in the IC chip is misused. Such a problem becomes serious in the case where when the IC card is used in electronic settlement of accounts, the electronic settlement of accounts is misused and money is illicitly drawn out.

SUMMARY OF THE INVENTION

An object of the invention is to provide an electronic apparatus which facilitates implementing of an IC chip and an antenna herefor in the electronic apparatus and prevents illicit misuse by a third party.

The invention provides an electronic apparatus having: a first portion and a second portion which are removable from each other, wherein the first portion has an antenna and a first connection terminal connected to the antenna, the second portion has a noncontact IC chip and a second connection terminal connected to the noncontact IC chip, and when the second portion is mounted to the first portion, the first connection terminal and the second connection terminal are brought into contact with each other so that the noncontact IC chip and the antenna are electrically connected.

In the electronic apparatus, the first portion is a main body of the electronic apparatus, which includes a battery containing portion, the second portion is a battery lid which covers the battery containing portion, the antenna and the first connection terminal are provided in the battery containing portion, and the noncontact IC chip and the second connection terminal are provided in an inner face of the battery lid.

In the electronic apparatus, the second portion is a main body of the electronic apparatus, which includes a battery containing portion, the first portion is a battery lid which covers the battery containing portion, the noncontact IC chip and the second connection terminal are provided in the main body, and the antenna and the first connection terminal are provided in an inner face of the battery lid.

In the electronic apparatus, the noncontact IC chip and the second connection terminal are provided in the battery containing portion.

In the electronic apparatus, the antenna and the first connection terminal are provided in an insulating synthetic resin film, and the antenna, the first connection terminal, and the insulating synthetic resin film constitute an antenna unit.

In the electronic apparatus, one end of the antenna is penetrated through the insulating synthetic resin film to reach a rear face of the insulating synthetic resin film at a center portion thereof, is extended to the first connection terminal by constituting wiring on the rear face, is returned to the front face of the insulating synthetic resin film, and then is connected to the first connection terminal.

In the electronic apparatus, a recess is provided on the battery lid, and the noncontact IC chip is provided in the recess so that the noncontact IC chip does not collide with a battery mounted in the battery containing portion when the battery lid is attached to the battery containing portion.

According to the electronic apparatus, implementation of an IC chip and an antenna herefor is facilitated and illicit misuse by a third party is prevented.

BRIEF DESCRIPTION OF THE DRAWINGS

FIG. 1A is a perspective view showing from a face of a portable telephone having a liquid crystal display portion and a button operation portion according to a first embodiment of an electronic apparatus of the invention, FIG. 1B is a perspective view viewing from a face of the portable telephone opposed to a front face thereof, FIG. 1C is a view illustrating a battery lid in which a noncontact IC chip and a second connection terminal are provided, FIG. 1D is a view illustrating a rear face of the battery lid, and FIG. 1E is a view illustrating a side face of the battery lid;

DETAILED DESCRIPTION OF THE PREFERRED EMBODIMENTS

Figure 2A:
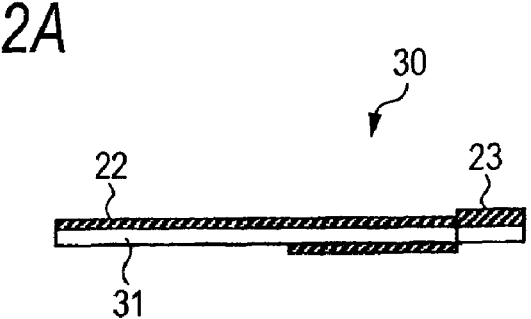
FIG. 2A is a sectional view of an antenna unit provided in the portable telephone illustrated in FIGS. 1A to 1E.

An embodiment of an electronic apparatus having an IC card according to the invention will be described in reference to FIGS. 1A to 1E.

A portable telephone will be exemplified as an embodiment of the electronic apparatus according to the invention.

First Embodiment

FIG. 1A is a perspective view viewing a face having a liquid crystal display portion 13 and a button operating portion 14 of a portable telephone 1 (hereinafter, referred to as a front face), and FIG. 1B is a perspective view viewing a face opposed to the front face of the portable telephone 1 (hereinafter, referred to as a rear face).

The portable telephone 1 includes a main body 11 of the portable telephone 1, a portable telephone antenna 12, the liquid crystal display portion 13, the button operating portion 14, a battery containing portion 15 and a battery lid 17. The portable telephone antenna 12, the liquid crystal display portion 13, and the button operating portion 14 are used as those in a way of normally using the portable telephone 1.

Although various electronic circuits and the like are contained in the main body 11, in view of known constitutions thereof, illustration thereof is omitted. A battery (not shown) will be contained into the battery containing portion 15.

The battery lid 17 is removed from the battery containing portion 15 of the main body 11 when a battery is contained into the battery containing portion 15, or when the battery is removed from the battery containing portion 15. The battery lid 17 is fitted to cover the battery containing portion 15 of the main body 11 when the battery is contained into the battery containing portion 15.

As shown in FIG. 1B, an antenna 22 and a first connection terminal 23 connected with the antenna 22 are provided in the battery containing portion 15.

Figure 2B:
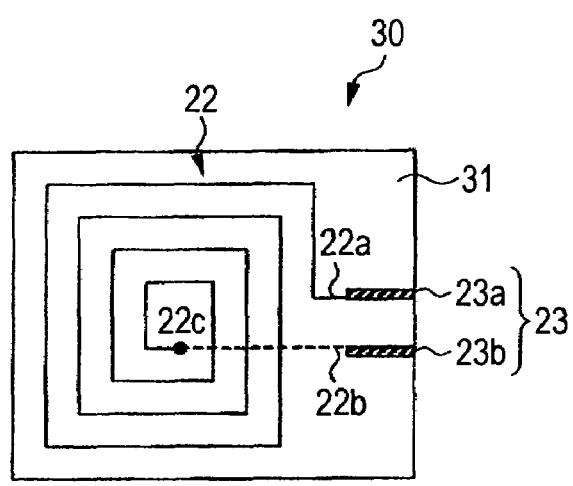
FIG. 2B is a top view of antenna unit.
Figure 2C:
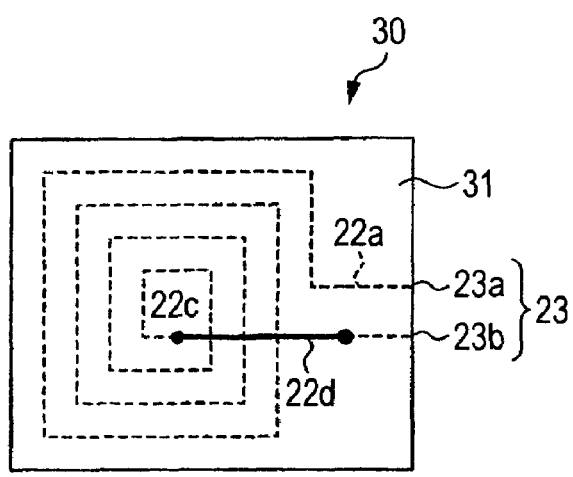
FIG. 2C is a bottom view of the antenna unit.

As a method of arranging the antenna 22 and the first connection terminal 23 to the battery containing portion 15, for example, as illustrated in FIGS. 2A to 2C, the antenna 22 and the first connection terminal 23 having terminals 23a and 23b are printed on a surface of an insulating synthetic resin film 31 in the form of a patterned thin film by using aluminum. In the pattern printing, pattern printing is carried out to connect one terminal 22a of the antenna 22 with one terminal 23a of the first connection terminal 23.

One end of the antenna 22 is wound by a turn number to achieve a desired characteristic of a noncontact IC chip.

The antenna 22 is penetrated through the insulating synthetic resin film 31 to reach a rear face of the insulating synthetic resin film 31 at a center portion 22c thereof, extended to a second terminal 23b of the first connection terminal 23 by constituting a wiring 22d on the rear face of the synthetic resin film 31, and a part of the second terminal 23b is returned to a surface of the synthetic resin film 31 and is connected to the second terminal 23b of the first connection terminal 23 at other terminal 22b.

A unit in which the antenna 22 and the first connection terminal 23 are mounted to the synthetic resin film 31 is referred to as an antenna unit 30 in the specification.

The antenna unit 30 fabricated beforehand in this way is pasted to a bottom portion of the battery containing portion 15 of the portable telephone 1.

According to the pasting of the antenna unit 30 to the bottom portion in this way, the antenna unit 30 can easily be mounted to the existing portable telephone 1 and can easily be removed when the antenna unit 30 is not needed.

FIG. 1C is a view for illustrating a face thereof fitted to cover the battery containing portion 15 (hereinafter, referred to as inner side face). FIG. 1D is a view illustrating a face of the battery lid 17 on a side opposed to the rear face (hereinafter, referred to as outer side face). FIG. 1E is a side view of the battery lid 17.

A noncontact IC chip 21 and a second connection terminal 24 connected hereto are provided on the inner side face of the battery lid 17. Further, the second connection terminal 24 includes two terminals, that is, a first and a second terminals 24a, 24b.

The battery lid 17 is normally fabricated from a synthetic resin and the noncontact IC chip 21 and the second connection terminal 24 can be pasted to a face of the synthetic resin by, for example, an adhesive.

The noncontact IC chip 21 includes IC, a memory, capacitor, resistor elements constituting a rectifying circuit and the like. Although the noncontact IC chip 21 is small-sized, the noncontact IC chip 21 has more or less thickness so that when the battery lid 17 is attached to the battery containing portion 15, there is also a possibility that the noncontact IC chip 21 collides with a battery mounted to the battery containing portion 15.

In such a case, as illustrated in FIG. 1E, a recess is provided at the inner side face of the battery lid 17 made of a synthetic resin and the noncontact IC chip 21 is contained in the recess.

The second connection terminal 24 is disposed at the battery lid 17 such that when the battery lid 17 is attached to the battery containing portion 15, the first and the second terminals 24a, 24b of the second connection terminal 24 respectively contact with the first and the second terminals 23a, 23b of the first connection terminal 23 connected to the antenna 22. The noncontact IC chip 21 and the first and the second terminals 24a, 24b of the second connection terminal 24 are connected via a pattern wiring.

When the battery lid 17 is attached to the battery containing portion 15, the first connection terminal 23 and the second connection terminal 24 contact with each other. Actually, the first terminal 23a of the first connection terminal 23 contacts with the first terminal 24a of the second connection terminal 24 and the second terminal 23b of the first connection terminal 23 contacts with the second terminal 24b of the second connection terminal 24.

Thus, the noncontact IC chip 21 and the antenna 22 are substantially connected.

Under the state, when the portable telephone 1 enters a region at which the antenna 22 can communicate with a reader/writer, the antenna 22 receives a radio wave from the reader/writer, and power is generated by the principle of electromagnetic induction and the generated power is supplied to the noncontact IC chip 21 via the second connection terminal 24.

A rectifying circuit and a capacitor are contained in the noncontact IC chip 21, and a voltage fed from the reader/writer via the antenna 22 is rectified to change a voltage by which IC, a memory and other elements can be operated.

Thus, the IC and the memory can be operated and communication is performed with the reader/writer via the antenna 22.

By communication between the noncontact IC chip 21 and the reader/writer, various signal processings can be performed by the noncontact IC chip 21 such as confirming an ID code preserved in the memory, and updating data after confirming the ID code.

When a user of the portable telephone 1 intends to prevent the noncontact IC chip 21 provided in the battery lid 17 from being illegally used by a third party such as data falsification and other abuse, the user removes the battery lid 17 from the main body 11.

In this way, the noncontact IC chip 21 and the antenna 22 are bought into a noncontact state, power is not fed to the noncontact IC chip 21 so that the noncontact IC chip 21 cannot operate. Therefore, the third party cannot misuse the noncontact IC chip 21.

Further, when the battery lid 17 is removed from the main body 11, the noncontact IC chip 21 and the antenna 22 are brought into the noncontact state. Therefore, even when the user unintentionally drops or loses the battery lid 17, a malicious third party cannot tamper with or steal data stored in the memory of the noncontact IC chip 21 because the noncontact IC chip 21 in the battery lid 17 is not provided with the antenna 22 constituting a power feeding means.

As a method of mounting the antenna 22 and the first connection terminal 23 in the battery containing portion 15 of the main body 11, various methods other than the above-described method can be adopted.

For example, the antenna unit 30 illustrated in FIGS. 2A to 2C may not be used, the antenna 22 may be fixed by winding a wiring for antenna directly along a wall face of the bottom face at inside of the battery containing portion 15, and the first connection terminal 23 may be disposed at a portion of the battery containing portion 15 where the battery lid 17 contacts with the battery containing portion 15.

Second Embodiment

According to a second embodiment, the noncontact IC chip 21 and the antenna 22 are contrarily provided as compared with the first embodiment.

Figure 3A:
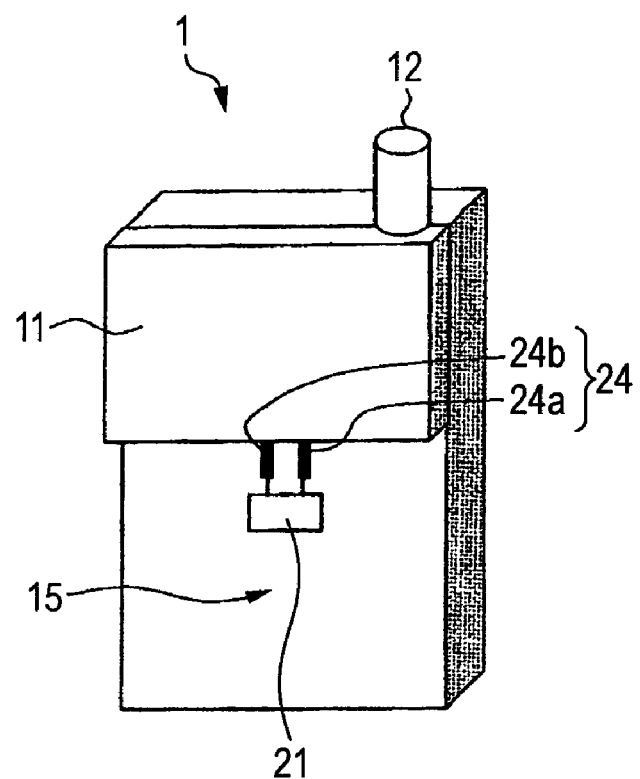
FIG. 3A is a perspective view viewing from a face on a side opposed to a face of a portable telephone having a liquid crystal display portion and a button operation portion according to a second embodiment of an electronic apparatus of the invention.

That is, as illustrated in FIG. 3A, the noncontact IC chip 21 is provided in the main body 11 of the portable telephone 1, and a second connection terminal 24 (first and the second terminals 24a, 24b) connected to the noncontact IC chip 21 is disposed at a portion of the battery containing portion 15 where the battery lid 17 contacts with the battery containing portion 15.

Figure 3B:
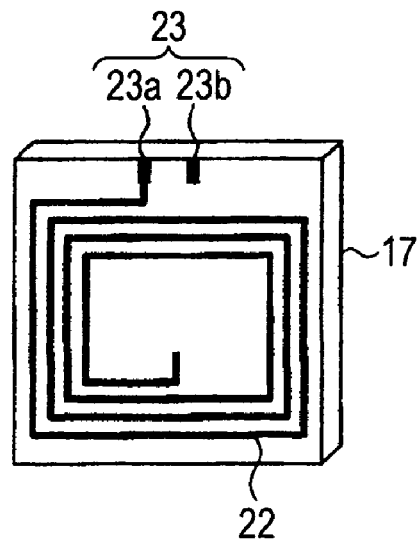
FIG. 3B is a view illustrating a battery lid having an antenna and a first connection terminal.

Further, as illustrated in FIG. 3B, the antenna 22 and the first connection terminal 23 (first and the second terminals 23a, 23b) are provided on the inner face side of the battery lid 17. Therefore, the battery lid 17 has a function similar to that of the antenna unit 30 illustrated in FIGS. 2A to 2C.

In the second embodiment also, when the battery lid 17 is attached to the battery containing portion 15, the noncontact IC chip 21 and the antenna 22 are connected to enable to be operable. However, when the battery lid 17 is removed, the noncontact IC chip 21 is not connected to the antenna 22 so that the noncontact IC chip 21 cannot operate.

Further, in the case that the noncontact IC chip 21 is provided in the main body 11 and disposed at a vicinity of an electronic circuit of the main body 11 of the portable telephone 1, it is difficult to remove the noncontact IC chip 21 and misuse by tampering with data or stealing data stored in the noncontact IC chip 21.

As described above, according to the portable telephone 1 of the embodiments, there is achieved an advantage of capable of resolving the problem of ensuring a wide area in which to arrange the antenna 22 and the problem of mounting the noncontact IC chip 21 and capable of preventing the noncontact IC chip 21 from being misused.

Although the portable telephone 1 is exemplified as an electronic apparatus having the IC chip of the invention, an electronic apparatus of the invention is not limited to the portable telephone 1 but is applicable to various electronic apparatus, for example, an electronic dictionary, a palm top computer, a digital camera and the like.

What is claimed is:

1. An electronic apparatus comprising:
    a first portion and a second portion which are removable from each other,
    wherein the first portion has an antenna for a noncontact IC chip, which is capable of generating electric power by electromagnetic induction, and a first connection terminal connected to the antenna for the noncontact IC chip,
    the second portion has the noncontact IC chip and a second connection terminal connected to the noncontact IC chip,
    the antenna for the noncontact IC chip and the first connection terminal are disposed at positions corresponding to the second portion,
    the noncontact IC chip and the second connection terminal are disposed at positions corresponding to the first portion,
    when the second portion is mounted to the first portion, the first connection terminal and the second connection terminal are brought into contact with each other so that the noncontact IC chip and the antenna for the noncontact IC chip are electrically connected, and the electric power generated by the antenna for the noncontact IC chip is supplied to the noncontact IC chip via the second connection terminal, and
    wherein both ends of the antenna for the noncontact IC chip connect to the first connection terminal, and the antenna for the noncontact IC chip is disposed in an annular shape at the position corresponding to the second portion.

2. The electronic apparatus according to claim 1,
    wherein the first portion is a main body of the electronic apparatus, which includes a battery containing portion,
    the second portion is a battery lid which covers the battery containing portion,
    the antenna and the first connection terminal are provided in the battery containing portion, and
    the noncontact IC chip and the second connection terminal are provided in an inner face of the battery lid.

3. The electronic apparatus according to claim 2,
    wherein a recess is provided on the battery lid, and the noncontact IC chip is provided in the recess so that the noncontact IC chip does not collide with a battery mounted in the battery containing portion when the battery lid is attached to the battery containing portion.

4. The electronic apparatus according to claim 1,
    wherein the second portion is a main body of the electronic apparatus, which includes a battery containing portion,
    the first portion is a battery lid which covers the battery containing portion,
    the noncontact IC chip and the second connection terminal are provided in the main body, and
    the antenna and the first connection terminal are provided in an inner face of the battery lid.

5. The electronic apparatus according to claim 4,
    wherein the noncontact IC chip and the second connection terminal are provided in the battery containing portion.

6. The electronic apparatus according to claim 1,
    wherein the antenna and the first connection terminal are provided in an insulating synthetic resin film, and
    the antenna, the first connection terminal, and the insulating synthetic resin film constitute an antenna unit.

7. The electronic apparatus according to claim 6, wherein one end of the antenna is penetrated through the insulating synthetic resin film to reach a rear face of the insulating synthetic resin film at a center portion thereof, is extended to the first connection terminal by constituting wiring on the rear face, is returned to the front face of the insulating synthetic resin film, and then is connected to the first connection terminal.

* * * * *